United States Patent
Igarashi

(10) Patent No.: US 9,463,586 B2
(45) Date of Patent: Oct. 11, 2016

(54) FOAM MOLDED BODY PRODUCTION DEVICE AND FOAM MOLDED BODY PRODUCTION METHOD

(75) Inventor: Masakazu Igarashi, Yokohama (JP)

(73) Assignee: BRIDGESTONE CORPORATION, Tokyo (JP)

(*) Notice: Subject to any disclaimer, the term of this patent is extended or adjusted under 35 U.S.C. 154(b) by 297 days.

(21) Appl. No.: 13/978,034

(22) PCT Filed: Dec. 16, 2011

(86) PCT No.: PCT/JP2011/079220
§ 371 (c)(1),
(2), (4) Date: Jul. 2, 2013

(87) PCT Pub. No.: WO2012/093576
PCT Pub. Date: Jul. 12, 2012

(65) Prior Publication Data
US 2013/0277877 A1  Oct. 24, 2013

(30) Foreign Application Priority Data
Jan. 6, 2011  (JP) .................. 2011-001459

(51) Int. Cl.
| | |
|---|---|
| *B29C 44/32* | (2006.01) |
| *B29C 33/12* | (2006.01) |
| *B29C 44/12* | (2006.01) |
| *B29C 44/58* | (2006.01) |
| *B29C 33/26* | (2006.01) |
| *B29C 33/16* | (2006.01) |
| *B29L 31/00* | (2006.01) |

(52) U.S. Cl.
CPC ............ *B29C 44/32* (2013.01); *B29C 33/12* (2013.01); *B29C 44/1271* (2013.01); *B29C 44/582* (2013.01); *B29C 33/16* (2013.01); *B29C 33/26* (2013.01); *B29L 2031/771* (2013.01)

(58) Field of Classification Search
CPC .. B29C 44/586; B29C 44/582; B29C 44/468

USPC ............ 425/127, 351, 436 R, 438, 440, 441, 425/442; 264/46.4, 46.6
See application file for complete search history.

(56) References Cited

U.S. PATENT DOCUMENTS

2005/0110181 A1* 5/2005 Ingwersen et al. .......... 264/46.5

FOREIGN PATENT DOCUMENTS

| GB | 2 216 838 A | 10/1989 |
|---|---|---|
| JP | 1-145416 U | 10/1989 |

(Continued)

OTHER PUBLICATIONS

International Search Report of PCT/JP2011/079220 dated Feb. 28, 2012.

*Primary Examiner* — Alison L Hindenlang
*Assistant Examiner* — Mohamed K Ahmed Ali
(74) *Attorney, Agent, or Firm* — Sughrue Mion, PLLC

(57) ABSTRACT

A production device (20) of a molded foam body includes an upper mold (21) and a lower mold (22) having a cavity (23) formed between mold surfaces (21a, 22a) facing each other, wherein a raw foam material is supplied on the mold surface (22a) of the lower mold (22) and a hard material (3) is detachably arranged on the mold surface (21a) of the upper mold (21), and the raw foam material is foamed in the cavity (23) with the hard material (3) arranged on the mold surface (21a) of the upper mold (21) to form a foam body and a portion other than a projection portion (11) of the hard material (3) is fixed to the foam body to form the molded foam body in which the projection portion (11) projects from the foam body, and wherein on the mold surface (21a) of the upper mold (21), a concave arrangement portion (28) that is opened toward the lower mold (22) side and on which the projection portion (11) is arranged is formed, and a pivotable mold (27) that opens and closes the concave arrangement portion (28) from the lower mold (22) side by rotating around a pivot shaft (26) extending in a direction along the mold surface (21a) is provided.

3 Claims, 4 Drawing Sheets

(56) References Cited

FOREIGN PATENT DOCUMENTS

| JP | 6-277130 A | 10/1994 |
| JP | 8-183044 A | 7/1996 |
| JP | 08183044 * | 7/1996 |
| JP | 2005-288699 A | 10/2005 |

* cited by examiner

FOAM MOLDED BODY PRODUCTION DEVICE AND FOAM MOLDED BODY PRODUCTION METHOD

CROSS REFERENCE TO RELATED APPLICATIONS

This application is a National Stage of International Application No. PCT/JP2011/079220 filed Dec. 16, 2011, claiming priority based on Japanese Patent Application No. 2011-001459, filed Jan. 6, 2011, the contents of all of which are incorporated herein by reference in their entirety.

TECHNICAL FIELD

The present invention relates to a production device of a molded foam body and a production method of the molded foam body. Priority is claimed based on Japanese Patent Application No. 2011-001459, filed Jan. 6, 2011, the content of which is incorporated herein by reference.

BACKGROUND ART

In the past, for example, a seat pad fixed to a seat frame of a vehicle as disclosed in Patent Document 1, to be described below, has been known. The seat pad includes a foam body formed by foaming a raw foam material, and a frame member fixed to the foam body when the foam body is formed. Furthermore, a part (hereinafter referred to as a projection portion) of the frame member projects from the foam body.

In the production method of the seat pad which forms this type of seat pad, generally, a mold including an upper mold and a lower mold having a cavity formed between mold surfaces facing each other has been used. In the production method, in the state in which the frame member is arranged in the cavity, the raw foam material is foamed in the cavity to form a foam body in which the whole frame member is buried. Moreover, by removing an excessive thickened portion that covers the projection portion of the frame member, the molded foam body is formed.

CITATION LIST

Patent Document

Patent Document 1
Japanese Unexamined Patent Application, First Publication No. H06-277130

SUMMARY OF INVENTION

Technical Problem

However, in the production method of the seat pad of the related art, there is a need to remove the excessive thickened portion of the foam body. For this reason, materials are wasted, and removal work of the excessive thickened portion of the foam body becomes essential. As a result, there is a problem in that the production cost increases.

In addition, as a method of reducing waste of materials, a method of covering the projection portion of the frame member with a jig before the foam body is formed, arranging the frame member in the cavity with the jig attached to form the foam body, and then detaching the jig from the projection portion has also been considered. However, even in the method, since work of attaching and detaching the jig to and from the projection portion of the frame member in a previous process and a next process also becomes essential, there is a problem in that the production cost increases.

The present invention has been made in view of the above-mentioned circumstances, and an object thereof is to provide a production device of a molded foam body, and a production method of the molded foam body, that are capable of forming the molded foam body at a low cost.

Solution to Problem

In order to accomplish the aforementioned object, the present invention suggests the following means.

A production device of a molded foam body according to a first aspect of the invention includes an upper mold and a lower mold having a cavity formed between mold surfaces facing each other. Furthermore, a raw foam material is supplied on the mold surface of the lower mold, and a hard material is detachably arranged on the mold surface of the upper mold. Furthermore, the raw foam material is foamed in the cavity to form the foam body with the hard material arranged on the mold surface of the upper mold, and a portion other than the projection portion of the hard material is fixed to the foam body, thereby forming the molded foam body in which the projection portion projects from the foam body. On the mold surface of the upper mold, a concave arrangement portion, which is opened toward the lower mold side and on which the projection portion is arranged, is formed, and a pivotable mold, which pivots around a pivot shaft extending in a direction along the mold surface to open concave arrangement portion from the lower mold side, is provided.

In addition, according to a second aspect of the invention, there is provided a production method of a molded foam body for forming the molded foam body using the production device of the molded foam body, the method including an arrangement process of arranging the hard material on the mold surface of the upper mold in the production device of the molded foam body in which the mold is opened, and arranging the projection portion on the opened concave arrangement portion; a mold-closing process of closing the mold of the production device of the molded foam body by moving the upper mold and the lower mold relatively closer to each other to form the cavity; a molding process of foaming the raw foam material in the cavity to form the molded foam body; and a demolding process of detaching and demolding the molded foam body from the upper mold after the mold of the production device of the molded foam body is opened. After the arrangement process and before the molding process, the pivotable mold is pivoted to close the concave arrangement portion.

In the aspects of the invention, first, the hard material is arranged on the mold surface of the upper mold in the production device of the molded foam body in which the mold is opened, and the projection portion of the hard material is arranged on the opened concave arrangement portion. At this time, the hard material is moved closer to the mold surface from the direction intersecting with the mold surface. Thus, it is possible to cause the projection portion of the hard material to smoothly enter the opened concave arrangement portion.

Thereafter, the pivotable mold is pivoted to close the concave arrangement portion, and the upper mold and the lower mold are moved relatively closer to each other. Thus, the mold of the production device of the molded foam body is closed to form the cavity. Moreover, the raw foam material is foamed in the cavity to form the molded foam body. Since the concave arrangement portion is closed from the lower mold side by the pivotable mold, it is possible to prevent the foamed raw foam material from reaching the concave arrangement portion from the lower mold side.

Thereafter, after the mold of the production device of the molded foam body is opened, the molded foam body is detached and demolded from the upper mold. At this time, when the molded foam body is detached from the upper mold in the direction intersecting with the mold surface, as the molded foam body is detached from the upper mold, and the pivotable mold is pivoted around a pivot shaft extending in the direction along the mold surface. Thus, the pivotable mold is pivoted while the molded foam body is detached from the upper mold, which makes it also possible to detach the molded foam body from the pivotable mold. As a result, demolding of the molded foam body can be smoothly performed.

In this manner, when the raw foam material is foamed in the cavity, it is possible to prevent the raw foam material from reaching the concave arrangement portion from the lower mold surface side. Accordingly, it is possible to suppress formation of the excessive thickened portion that covers the projection portion of the hard material, and to reduce waste of material. As a result, the molded foam body can be formed at low cost.

Furthermore, by performing simple work of pivoting the pivotable mold to open and close the concave arrangement portion, waste of material can be suppressed even when the work is not performed in the previous process and the next process. As a result, the molded foam body can be reliably formed at a low cost.

Moreover, when the hard material is arranged on the mold surface of the upper mold, it is possible to cause the projection portion of the hard material to smoothly enter the concave arrangement portion, and demolding of the molded foam body can be more smoothly performed. Thus, it is possible to prevent the work from becoming complicated due to the provision of the pivotable mold in the upper mold. As a result, the molded foam body can be more reliably formed at a low cost.

Furthermore, in the production device of the molded foam body according to the invention, the upper mold may approach and be separated from the lower mold by pivoting around an opening and closing shaft extending in a direction along the mold surface of upper mold, and the pivot shaft may extend along the opening and closing shaft.

In this case, when the molded foam body is detached from the mold, first, the upper mold is separated and moved by pivoting the upper mold around the opening and closing shaft, thereby opening the mold of the production device of the molded foam body. At this time, the upper mold is pivoted around the opening and closing shaft toward the back side serving as a direction of the horizontal direction in which the opening and closing shaft is located with respect to the upper mold in the state in which the mold of the production device of the molded foam body is closed. Moreover, the mold surface of the upper mold faces forward.

Thereafter, the molded foam body is detached and demolded from the upper mold. The pivot shaft of the pivotable mold extends along the opening and closing shaft. For this reason, by substantially straightly detaching the molded foam body forward from the upper mold, the molded foam body can be detached from the upper mold and the pivotable mold demolding of the molded foam body can be more smoothly performed.

In this manner, when the molded foam body is demolded, by substantially straightly detaching the molded foam body forward from the upper mold, the molded foam body can be detached from the upper mold and the pivotable mold. Accordingly, the demolding work of the molded foam body can be more easily performed. As a result, the molded foam body can be more reliably formed at a low cost.

Furthermore, in the production device of the molded foam body according to the invention, the pivotable mold may be magnetically attached to the upper mold while closing the concave arrangement portion.

In this case, since the pivotable mold is magnetically attached to the upper mold while closing the concave arrangement portion, closing of the concave arrangement portion using the pivotable mold can be reliably maintained, and the above-mentioned effect can be reliably achieved.

Advantageous Effects of Invention

According to the production device of the molded foam body and the production method of the molded foam body according to the invention, the molded foam body can be formed at a low cost.

DESCRIPTION OF EMBODIMENTS

Hereinafter, a seat pad (molded foam body) formed by a mold (production device of the molded foam body) according to an embodiment of the invention will be described with reference to the drawings.

Figure 1:
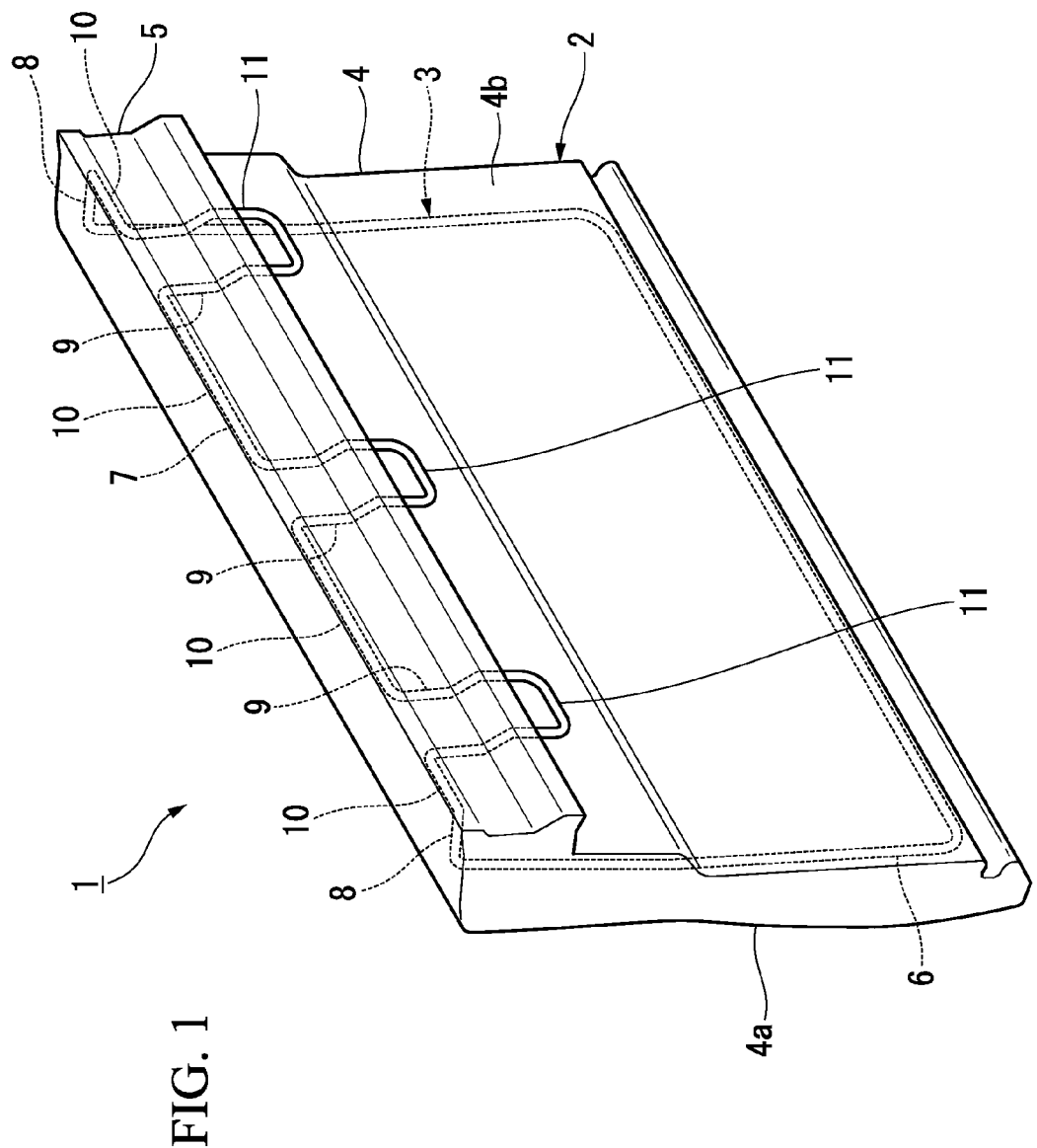
FIG. 1 is a perspective view of a seat pad formed by a mold according to an embodiment of the invention.

As illustrated in FIG. 1, for example, a seat pad 1 is used as a back pad serving as a back portion in a rear seat of a vehicle (not illustrated). The seat pad 1 includes a foam body 2 that is formed by foaming of a raw foam material, and a frame member (hard material) 3 that is fixed to the foam body 2 when the foam body 2 is formed.

The foam body 2 includes a main body portion 4 having a front 4*a* that is formed by a mold surface 22*a* of a lower mold 22 to be described below, and a projection portion 5 that projects to a rear 4*b* of the main body portion 4.

The front 4 of the main body portion 4 serves as a back surface touched by a back of a passenger of the vehicle.

The projection portion 5 is disposed on the upper end serving as a head portion side of a passenger on the rear 4*b* of the main body portion 4, and extends along a width direction of the main body portion 4.

The frame member 3 is formed in a frame shape that extends along an outer circumferential edge of the main body portion 4 in a front view in which the seat pad 1 is viewed from the front 4*a* side of the main body portion 4. Furthermore, a portion of the frame member 3 other than a projection portion 11 to be described below is buried in and fixed to the foam body 2, and serves as a core material that maintains the shape of the foam body 2. In addition, the frame member 3 is harder than the foam body 2, and, for example, is formed of a metal material or the like that is magnetically attached to a magnet.

The frame member 3 includes a U-shaped main body portion side portion 6 as viewed in the front view that is buried in the main body portion 4 and opens upward, a projection portion side portion 7 that is buried in the projection portion 5 and extends in the width direction, and a pair of connection portions 8 that individually connect both upper ends of the main body portion side portion 6 and both end portions of the projection portion side portion 7.

The projection portion side portion 7 includes a plurality of U-shaped bending portions 9 as viewed from the front view that are arranged at intervals in the width direction and open upward, and a plurality of straight line portions 10 that extend in the width direction and connect the bending portions 9 adjacent to each other in the width direction, or the bending portion 9 and the connection portion 8 adjacent to each other in the width direction. Moreover, the lower end of the bending portion 9 is the projection portion 11 that projects from the foam body 2, and a plurality of the projection portions 11 are arranged at intervals in the width direction.

The projection portions 11 project from the projection portion 5 of the foam body 2 in a direction intersecting with the projection direction of the projection portion 5, among the directions along the rear 4b of the main body portion 4 of the foam body 2, and are arranged between the projection portion 11 and the rear 4b of the main body portion 4 at intervals.

Next, a mold 20 that forms the seat pad 1 will be described.

Figure 2:
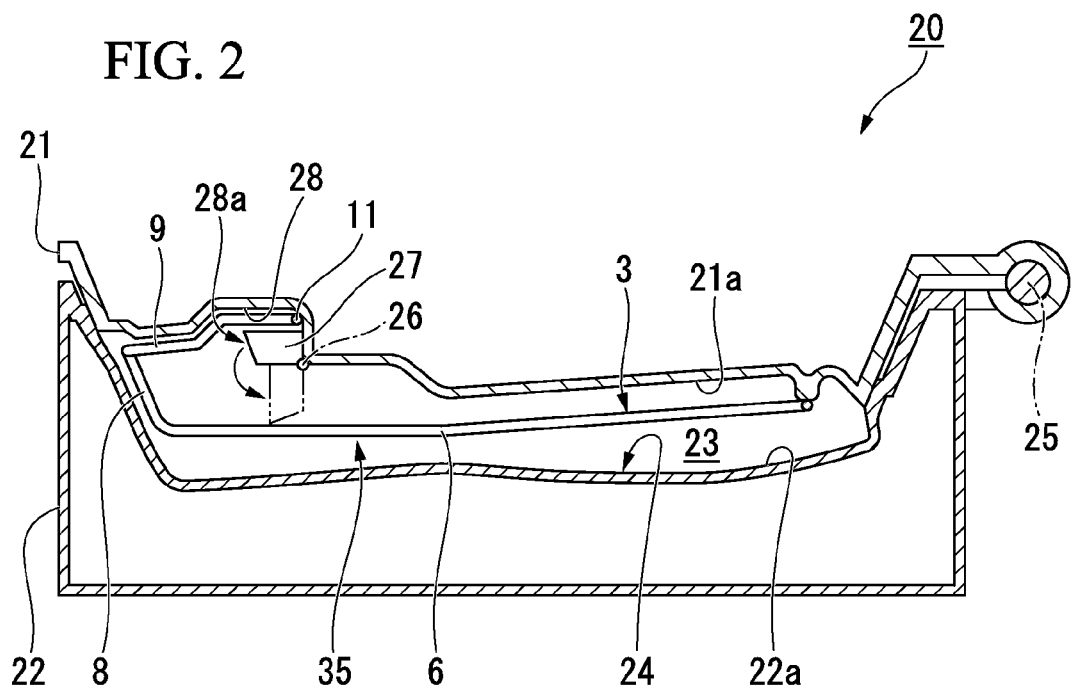
FIG. 2 is a longitudinal cross-sectional view in a forward/rearward direction of the mold according to an embodiment of the invention.

As illustrated in FIG. 2, the mold 20 includes an upper mold 21 and a lower mold 22 having a cavity 23 formed between mold surfaces 21a and 22a facing each other. The upper mold 21 and the lower mold 22 can be formed of, for example, aluminum materials that are suitable for temperature control and light-weight.

A supply concave portion 24 supplied with raw foam material is formed on the mold surface 22a of the lower mold 22.

The upper mold 21 approaches and is separated from the lower mold 22 by pivoting around the opening and closing shaft 25 that extends in the direction along the mold surface 21a of the upper mold 21.

In addition, hereinafter, in the horizontal direction, a direction in which the opening and closing shaft 25 is located with respect to the upper mold 21 when the mold 20 is closed, is assumed to be a rear side, and an opposite side thereto is assumed to be a front side. In the present embodiment, the upper end side of the seat pad 1 is formed on the front side portion of the cavity 23, and the lower end side of the seat pad 1 is formed on the rear side portion of the cavity 23.

The frame member 3 is detachably arranged on the mold surface 21a of the upper mold 21, and an adsorbing means (not illustrated) that adsorbs the frame member 3 arranged on the mold surface 21a is provided.

Furthermore, on the mold surface 21a of the upper mold 21, a concave arrangement portion 28 is formed which opens toward the lower mold 22 side and on which the projection portion 11 of the frame member 3 is arranged when the frame member 3 is arranged on the mold surface 21a. The plurality of the concave arrangement portions 28 are arranged on the mold surface 21a of the upper mold 21 at intervals, and the concave arrangement portion 28 corresponds to each of the projection portions 11 of the seat pad 1.

Figure 3:
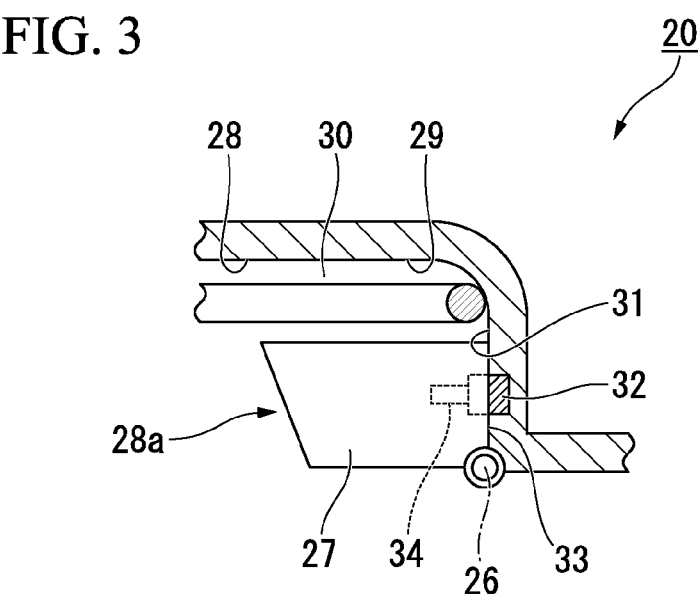
FIG. 3 is an enlarged longitudinal cross-sectional view of major parts of the mold illustrated in FIG. 2.

The concave arrangement portion 28 is formed on the front side portion of the mold surface 21a of the upper mold 21. As illustrated in FIG. 3, the inner surface of the concave arrangement portion 28 includes an upper surface portion 29 facing downward, a pair of side surface portions 30 that individually extend downward from both ends in a direction of a pivot shaft 26 to be described below in the upper surface portion 29 and face each other at intervals, and a rear surface portion 31 that is connected to each rear end of the upper surface portion 29 and both of the side surface portions 30 and faces forward. In addition, for example, a magnetic attaching member 32 formed of a magnet or the like is provided on the rear surface portion 31.

Furthermore, on the mold surface 21a of the upper mold 21, a pivotable mold 27 is provided which opens and closes the concave arrangement portion 28 from the lower mold 22 side by rotating around the pivot shaft 26 extending in the direction along the mold surface 21a. The pivot shaft 26 of the pivotable mold 27 extends in the direction along the opening and closing shaft 25 among the directions along the mold surface 21a of the upper mold 21. The pivotable mold 27 closes the concave arrangement portion 28 by being accommodated in the opening side portion 28a of the concave arrangement portion 28 located on the lower mold 22 side.

For example, the pivotable mold 27 is formed of aluminum materials or the like in a rectangular parallelepiped body shape. Moreover, a rear surface 33 facing rearward in the pivotable mold 27 abuts the rear surface portion 31 of the concave arrangement portion 28. Both side surfaces (not illustrated) in the pivotable mold 27 facing the direction of the pivot shaft 26 individually abut the side surface portions 30 of the concave arrangement portion 28. Thus, the concave arrangement portion 28 opens toward the front serving as a direction of the horizontal direction, while closed by the pivotable mold 27, and is closed from in directions other than the front, i.e., both sides in the vertical direction, both sides in the direction of the pivot shaft 26, and a rear side.

Furthermore, the lower end of the rear surface 33 of the pivotable mold 27 is connected to the lower end of the rear surface portion 31 of the concave arrangement portion 28 via the pivot shaft 26. Additionally, an adherent 34 that is magnetically attached to a magnetic attaching member 32 in a detachable manner is provided on the rear surface 33 of the pivotable mold 27. The adherent 34 is magnetically attached to the magnetic attaching member 32 in the state in which the pivotable mold 27 closes the concave arrangement portion 28. In addition, for example, the adherent 34 can be formed by threadedly engaging with a bolt formed of a magnetic material into the rear surface 33 of the pivotable mold 27.

Next, a production method of the seat pad which forms the seat pad 1 using the mold 20 will be described.

Figure 4:
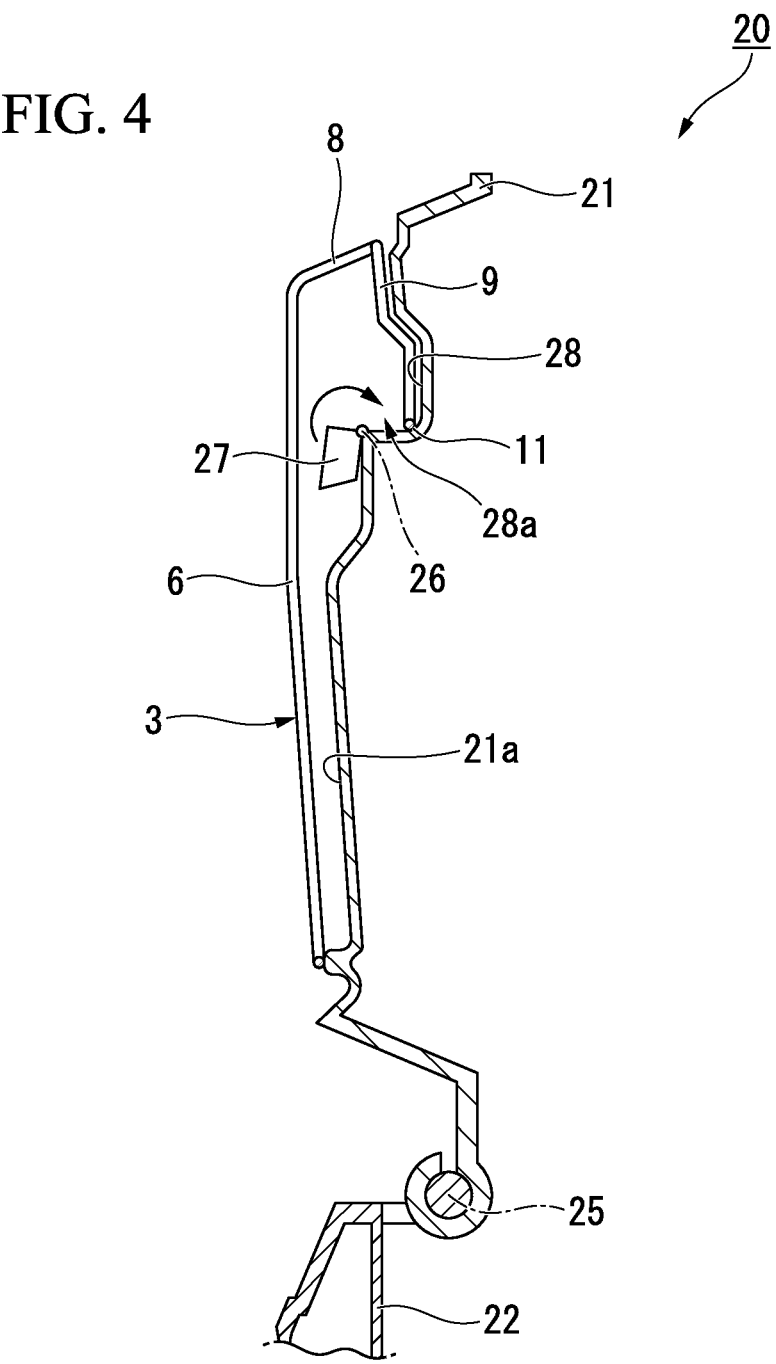
FIG. 4 is a diagram illustrating a production method of the seat pad using the mold illustrated in FIG. 2.

First, as illustrated in FIG. 4, the mold 20 is opened by moving the upper mold 21 and the lower mold 22 so as to be separated from each other. At this time, by rotating the upper mold 21 around the opening and closing shaft 25, the upper mold 21 is rotated obliquely upward and rearward around the opening and closing shaft 25. Thus, the mold surface 21a of the upper mold 21 faces forward.

Furthermore, the pivotable mold 27 is pivoted to open the concave arrangement portion 28.

Moreover, an arrangement process of arranging the frame member 3 on the mold surface 21a of the upper mold 21 in the opened mold 20 and arranging the projection portion 11 of the frame member 3 on the opened concave arrangement portion 28 is performed. At this time, by moving the frame member 3 so as to be closer to the mold surface 21a of the upper mold 21 from the front serving as the direction intersecting with the mold surface 21a, it is possible to cause the projection portion 11 of the frame member 3 to smoothly enter the concave arrangement portion 28 from the opening side portion 28a. With the above-mentioned method, the frame member 3 arranged on the mold surface 21a of the upper mold 21 is adsorbed by the adsorption unit.

Thereafter, a closing process of pivoting the pivotable mold 27 to close the concave arrangement portion 28 is performed. At this time, the adherent 34 of the pivotable mold 27 is magnetically attached to the magnetic attaching member 32 of the upper mold 21, and the pivotable mold 27 closing the concave arrangement portion 28 is magnetically attached to the upper mold 21.

Furthermore, a supplying process of supplying the raw foam material to the supply concave portion 24 in the mold surface 22a of the lower mold 22 is performed.

Moreover, as illustrated in FIG. 2, after the arrangement process, the closing process and the supplying process, a mold-closing process of closing the mold 20 by moving the upper mold 21 and the lower mold 22 so as to be relatively closer to each other to form the cavity 23 is performed.

Thereafter, a molding process of foaming the raw foam material in the cavity 23 to form the seat pad 1 is performed. The concave arrangement portion 28 is closed from the lower mold 22 side by the pivotable mold 27. For this reason, it is possible to prevent the foamed raw foam material from reaching the concave arrangement portion 28 from the lower mold 22 side through the opening side portion 28a. Accordingly, an exclusion space 35 serving as a portion of the cavity 23 other than the concave arrangement portion 28 is gradually filled with the raw foam material. Thereafter, foaming of the raw foam material is stabilized and resinification (resin reaction) of the raw foam material progresses, and thus the foam body 2 is formed. At the same time, a portion of the frame member 3 other than the projection portion 11 is fixed to the foam body 2, and the seat pad 1 capable of maintaining a regular form is formed.

Figure 5:
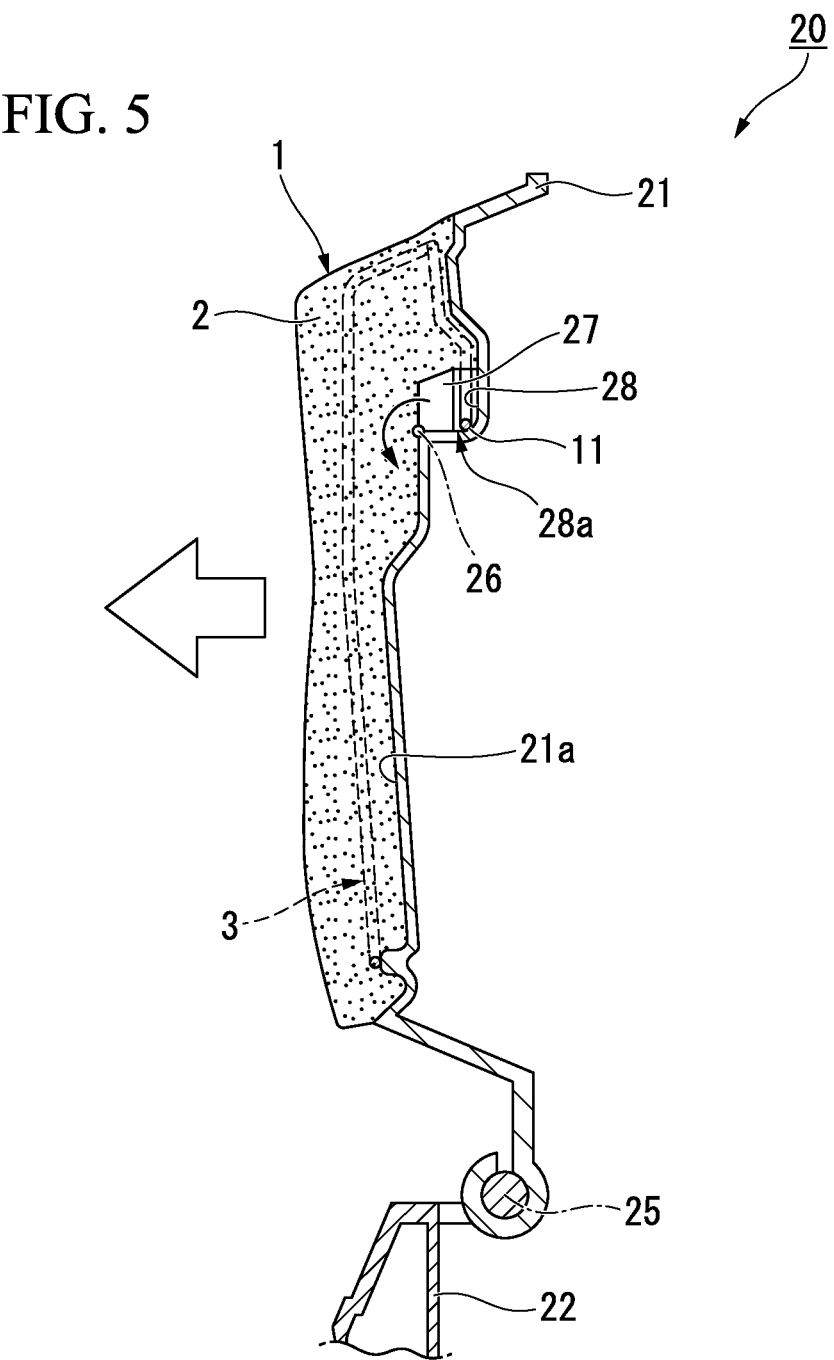
FIG. 5 is a diagram illustrating a production method of the seat pad using the mold illustrated in FIG. 2.

Moreover, as illustrated in FIG. 5, after the mold 20 is opened, a demolding process of detaching and demolding the seat pad 1 from the upper mold 21 is performed. At this time, when the seat pad 1 is detached from the upper mold 21 to the front, serving as the direction intersecting with the mold surface 21a, the seat pad 1 is detached from the upper mold 21, and as a result, the magnetic attachment of the adherent 34 of the pivotable mold 27 with respect to the magnetic attaching member 32 of the upper mold 21 is released. Furthermore, the pivotable mold 27 is pivoted around the pivot shaft 26 extending in the direction along the mold surface 21a of the upper mold 21. Thus, it is also possible to detach the seat pad 1 from the pivotable mold 27 by pivoting the pivotable mold 27 while detaching the seat pad 1 from the upper mold 21. As a result, demolding of the seat pad 1 can be smoothly performed.

Furthermore, in the present embodiment, the pivot shaft 26 of the pivotable mold 27 extends along the opening and closing shaft 25. For this reason, by substantially straightly detaching the seat pad 1 forward from the upper mold 21 in a state in which the mold 20 is opened and the mold surface 21a of the upper mold 21 faces forward, the seat pad 1 can be detached from the upper mold 21 and the pivotable mold 27. As a result, demolding of the seat pad 1 can be more smoothly performed.

As described above, according to the production method of the mold 20 and the seat pad related to the present embodiment, when the raw foam material is foamed in the cavity 23, it is possible to prevent the raw foam material from reaching the concave arrangement portion 28 from the lower mold 22 side through the opening side portion 28a. For this reason, it is possible to reduce waste of material by suppressing formation of the excessive thickened portion that covers the projection portion 11 of the frame member 3, and the seat pad 1 can be formed at a low cost.

Furthermore, since the pivotable mold 27 is magnetically attached to the upper mold 21 while closing the concave arrangement portion 28, closing of the concave arrangement portion 28 using the pivotable mold 27 can be reliably maintained, and the above-mentioned effect can be reliably achieved.

Moreover, the pivotable mold 27 is magnetically attached to the upper mold 21 while closing the concave arrangement portion 28. For this reason, for example, compared to a case in which the pivotable mold 27 and the upper mold 21 are engaged with each other or the like, at the time of demolding work of the seat pad 1, along with the detachment of the seat pad 1 from the upper mold 21, the pivotable mold 27 can be smoothly pivoted around the pivot shaft 26. As a result, demolding of the seat pad 1 can be reliably and smoothly performed.

Furthermore, by performing the simple work of pivoting the pivotable mold 27 to open and close the concave arrangement portion 28, even if the work is not performed in the previous process and the next process, waste of material can be reduced. As a result, the seat pad 1 can be reliably formed at a low cost.

Additionally, when the frame member 3 is arranged on the mold surface 21a of the upper mold 21, it is possible to cause the projection portion 11 of the frame member 3 to smoothly enter the concave arrangement portion 28, and demolding of the seat pad 1 can be more smoothly performed. For this reason, it is possible to prevent the work from becoming complicated by providing the pivotable mold 27 in the upper mold 21. As a result, the seat pad 1 can be more reliably formed at a low cost.

Furthermore, when the seat pad 1 is demolded, by substantially straightly detaching the seat pad 1 forward from the upper mold 21, the seat pad 1 can be detached from the upper mold 21 and the pivotable mold 27. For this reason, the demolding work of the seat pad 1 can be further simplified. As a result, the seat pad 1 can be more reliably formed at a low cost.

In addition, the technical scope of the invention is not limited to the above-mentioned embodiments, and various modifications can be added within the scope that do not depart from the central concept of the invention.

For example, in the above-mentioned embodiment, although the pivotable mold 27 is magnetically attached to the upper mold 21 while closing the concave arrangement portion 28, the configuration is not limited thereto. In this case, the magnetic attaching member 32 and the adherent 34 may be excluded, and for example, engaging means which are engaged with each other while the pivotable mold closes the concave arrangement portion to restrict the pivoting of the pivotable mold may be provided on the pivotable mold and the upper mold.

Furthermore, in the above-mentioned embodiment, although the pivot shaft 26 of the pivotable mold 27 extends along the opening and closing shaft 25, as long as the pivot shaft 26 extends in a direction along the mold surface 21a of the upper mold 21, the configuration is not limited thereto.

Furthermore, in the above-mentioned embodiment, although the plurality of pivotable molds 27 are provided in the mold surface 21a of the upper mold 21, as long as they are provided in the upper mold 21 so as to correspond to the projection portion 11 of the seat pad 1, the configuration is not limited thereto. For example, when there is one projection portion 11 in the seat pad 1, only one pivotable mold 27 can be provided.

Furthermore, in the above-mentioned embodiment, although the upper mold 21 approaches and is separated from the lower mold 22 by pivoting around the opening and closing shaft 25, the configuration is not limited thereto. For example, the upper mold 21 may approach and be separated from the lower mold 22 by the vertical movement in a vertical direction.

Furthermore, in the above-mentioned embodiment, although the closing process of pivoting the pivotable mold 27 to close the concave arrangement portion 28 is performed before the mold-closing process, as long as the closing process is performed after the arrangement process and before the molding process, the procedure in which the process is performed is not limited thereto. The closing process may be performed after the mold-closing process. In this case, for example, the closing process can also be performed by providing the mold with a driving mechanism (not illustrated) configured to pivot the pivotable mold and operating the driving mechanism after the mold-closing process.

Furthermore, in the above-mentioned embodiment, although the molded foam body formed using the mold 20 is assumed to be the seat pad 1, as long as there is a configuration in which the molded foam body formed using the mold includes the foam body formed by foaming the raw foam material, and a hard material fixed to the foam body when the foam body is formed, a portion of the hard material other than the projection portion is fixed to the foam body, and the projection portion projects from the foam body, the configuration can be suitably modified.

In addition, it is possible to suitably replace the components in the above-mentioned embodiment with well-known components within a scope that does not depart from the central concept of the present invention, and the above-mentioned modified examples may be suitably combined with each other.

INDUSTRIAL APPLICABILITY

According to the production device of the molded foam body, and the production method of the molded foam body related to the invention, the molded foam body can be formed at a low cost.

LIST OF REFERENCE NUMERALS

1 seat pad (molded foam body)
2 foam body
3 frame member (hard material)
11 projection portion
20 mold (production device of molded foam body)
21 upper mold
21*a* mold surface
22 lower mold
22*a* mold surface
23 cavity
25 opening and closing shaft
26 pivot shaft
27 pivotable mold

The invention claimed is:

1. A production device of a molded foam body comprising:
   an upper mold and a lower mold having a cavity formed between mold surfaces facing each other,
   wherein the mold surface of the lower mold is adapted to receive a raw foam material, and the mold surface of the upper mold is adapted to detachably receive a hard material, and
   the upper and lower molds are arranged so that the raw foam material is foamed in the cavity with the hard material arranged on the mold surface of the upper mold forming a foam body, a portion other than a projection portion of the hard material being fixed to the foam body to form the molded foam body in which the projection portion projects from the foam body;
   wherein on the mold surface of the upper mold there is a concave arrangement portion opening toward the lower mold side and on which the projection portion is arranged, and further comprising a pivotable mold that opens and closes the concave arrangement portion from the lower mold side by pivoting around a pivot shaft extending in a direction along the mold surface; and
   wherein the upper mold is adapted to approach and separate from the lower mold by pivoting around an opening and closing shaft that extends in a direction along the mold surface of the upper mold, the pivot shaft and the opening and closing shaft extend in the same axial direction, and the pivot shaft is disposed inside the cavity.

2. The production device of a molded foam body according to claim 1,
   wherein the pivotable mold is magnetically attached to the upper mold when the concave arrangement portion is closed.

3. The production device of a molded foam body according to claim 1,
   wherein the concave arrangement portion is formed at or near one end portion of the upper mold opposite to an opposite end portion of the upper mold where the opening and closing shaft is disposed, and
   the pivotable mold is connected to an inner side surface of the concave arrangement portion which faces toward the opposite end portion, via the pivot shaft.

* * * * *